(12) United States Patent
Goldstein et al.

(10) Patent No.: US 8,553,905 B2
(45) Date of Patent: **\*Oct. 8, 2013**

(54) ALWAYS ON HEADWEAR RECORDING SYSTEM

(75) Inventors: Steven Wayne Goldstein, Delray Beach, FL (US); John Usher, Devon (GB)

(73) Assignee: Personics Holdings Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,694

(22) Filed: Jan. 18, 2012

(65) Prior Publication Data

US 2012/0123573 A1    May 17, 2012

Related U.S. Application Data

(63) Continuation of application No. 12/100,281, filed on Apr. 9, 2008, now Pat. No. 8,111,839.

(60) Provisional application No. 60/910,808, filed on Apr. 9, 2007.

(51) Int. Cl.
H04R 3/00      (2006.01)

(52) U.S. Cl.
USPC ............. 381/92; 381/56; 381/57; 381/23.1; 381/312; 381/320

(58) Field of Classification Search
USPC ............. 381/1, 23.1, 56, 57, 92, 312, 320
See application file for complete search history.

(56) References Cited

U.S. PATENT DOCUMENTS

| | | |
|---|---|---|
| 4,088,849 A | 5/1978 | Usami |
| 4,819,270 A | 4/1989 | Lombardo |
| 5,887,070 A | 3/1999 | Iseberg |
| 5,917,410 A | 6/1999 | Cecic |
| 5,946,050 A | 8/1999 | Wolff |
| 5,987,145 A | 11/1999 | Lawton |
| 6,240,195 B1 * | 5/2001 | Bindner et al. ............. 381/316 |
| 6,433,690 B2 | 8/2002 | Petelenz |
| 6,567,524 B1 | 5/2003 | Svean |
| 6,647,368 B2 | 11/2003 | Nemirovski |
| RE38,351 E | 12/2003 | Iseberg |
| 6,661,901 B1 | 12/2003 | Svean |

(Continued)

OTHER PUBLICATIONS

U.S. Appl. No. 12/100,281, Non Final Office Action mailed Jun. 23, 2011, 11 pgs.

(Continued)

Primary Examiner — Jasmine Clark
(74) Attorney, Agent, or Firm — RatnerPrestia

(57) ABSTRACT

A system that records audio and stores the recording is provided. The system includes first and second monitoring assemblies mounted in an earpiece that occludes and forms an acoustic seal of an ear canal. The first monitoring assembly includes an ambient sound microphone (ASM) to monitor an ambient acoustic field and produce an ASM signal. The second monitoring assembly includes an ear canal microphone (ECM) to monitor an acoustic field within the ear canal and produce an ECM signal. The system also includes a data storage device configured to act as a circular buffer for continually storing at least one of the ECM signal or the ASM signal, a further data storage device and a record-activation system. The record-activation system activates the further data storage device to record a content of the data storage device.

20 Claims, 8 Drawing Sheets

(56) References Cited

U.S. PATENT DOCUMENTS

| | | |
|---|---|---|
| 6,728,385 B2 | 4/2004 | Kvaløy |
| 7,039,195 B1 | 5/2006 | Svean |
| 8,111,839 B2 * | 2/2012 | Goldstein et al. .............. 381/92 |
| 2004/0268078 A1 | 12/2004 | Hassan |
| 2006/0182287 A1 | 8/2006 | Schulein |

OTHER PUBLICATIONS

Kracht et al., "Noise in the Operating Room", ASA 151st Meeting, (Jun. 8, 2006), 2 pgs.

* cited by examiner

ALWAYS ON HEADWEAR RECORDING SYSTEM

CROSS-REFERENCE TO RELATED APPLICATIONS

This application is a continuation application of U.S. Ser. No. 12/100,281, filed Apr. 9, 2008, now issued as U.S. Pat. No. 8,111,839, which claims the benefit of U.S. provisional patent application No. 60/910,808 filed 9 Apr. 2007. The disclosure of which is incorporated herein by reference in its entirety.

FIELD OF THE INVENTION

The present invention relates to earpieces, in particular, though not exclusively, the present invention relates to recording audio for a particular time span while the earpiece is in use.

BACKGROUND OF THE INVENTION

The combination of the recent increase in Personal Media Players (PMPs) and rises in urban noise levels have all contributed to the ubiquity of in-ear-canal (or insert) earphones. Such insert headphones afford the user of 20-35 dB of passive noise attenuation, thereby allowing an increase signal-to-noise ratio for reproduced Audio Content (e.g. music from a PMP). This is advantageous for loud-noise work environments; such as medical operating rooms where sound pressure levels can reach in excess of 120 dB (Kracht et al, 2006). The assembly housing the earphones in the left and right ear of the user is, furthermore, ideally situated to house a number of microphones to facilitate binaural recording of the user's sound exposure.

U.S. Pat. No. 6,728,385 describes a system that uses the assembly described in U.S. Pat. No. 7,039,195 to detect user-created voice by comparing the signal level of the ECM and ASM's in one earpiece device to operate a VOX automatic "push-to-talk" switch. U.S. Pat. No. 7,039,195 also describes for in-situ estimation of the overview attenuation provided by the earpiece (i.e. a NRR).

U.S. Pat. No. 6,661,901 describes a system that uses the assembly described in U.S. Pat. No. 7,039,195 and a signal processing circuitry to transform the ECM signal into a signal which sounds natural to the user after processing and auditioning with the ECR.

A fall monitoring device is described in U.S. Pat. No. 6,433,690 comprising an accelerometer to detect whether the user's body is at an angle indicative of a fall. U.S. Pat. No. 6,647,368 also describes a method for detecting changes in head location using a pair of microphones to detect air pressure changes within and external to an occluded ear canal.

SUMMARY OF THE INVENTION

At least one exemplary embodiment is directed to a device (e.g., earpiece) that can record acoustic signals measured by microphones in the device.

At least one exemplary embodiment is directed to An Always-On Recording System (AORS) comprising: an acoustic monitoring assembly configured to monitor the acoustic field in a user's immediate environment using an Ambient Sound Microphone (ASM) to monitor sound at an occluded ear canal; a signal processing circuit operatively connected to the assembly, where the signal processing circuit is configured to amplify an ASM signal from the ASM and to equalize for the frequency sensitivity of the ASM; an acoustic field monitoring assembly configured to monitor the acoustic field in the occluded ear canal, comprising an ear canal microphone (ECM) mounted in an earpiece that forms an acoustic seal of the occluded ear canal; a signal processing circuit configured to amplify an ECM signal from the ECM and to equalize for the frequency sensitivity of the ECM; and a data storage device configured to act as a circular buffer for constantly storing at least one of the ECM signal and the ASM signal.

Further areas of applicability of exemplary embodiments of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Exemplary embodiments of present invention will become more fully understood from the detailed description and the accompanying drawings, wherein.

DETAILED DESCRIPTION OF EXEMPLARY EMBODIMENTS OF THE PRESENT INVENTION

Figure 1A:
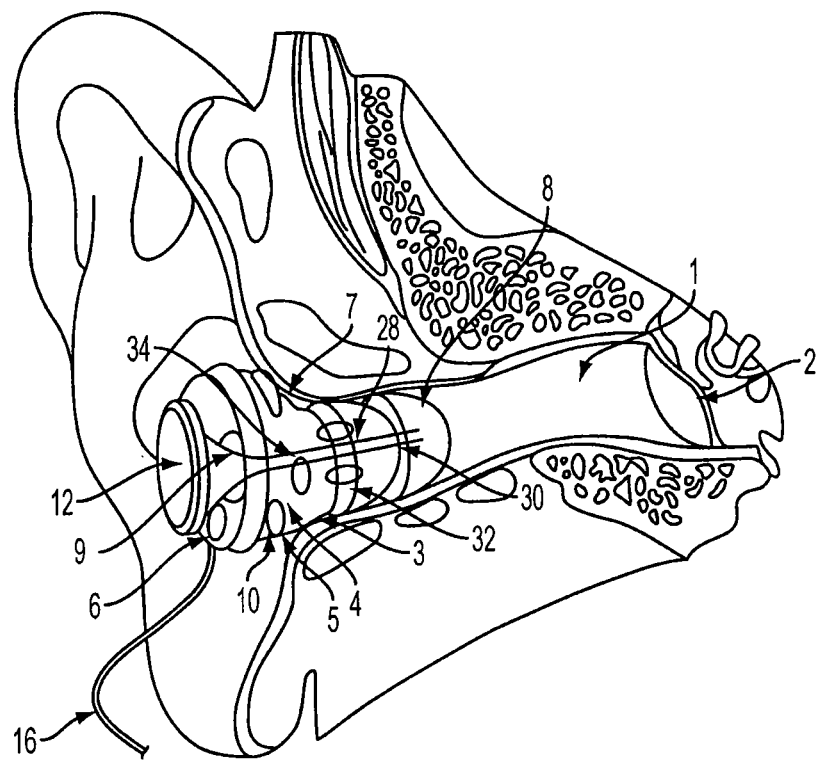
FIG. 1A is an illustration of a general earpiece configuration according to at least one exemplary embodiment.

The following description of exemplary embodiment(s) is merely illustrative in nature and is in no way intended to limit the invention, its application, or uses.

Exemplary embodiments are directed to or can be operatively used on various wired or wireless earpieces devices (e.g., earbuds, headphones, ear terminal, behind the ear devices or other acoustic devices as known by one of ordinary skill, and equivalents).

Processes, techniques, apparatus, and materials as known by one of ordinary skill in the art may not be discussed in detail but are intended to be part of the enabling description where appropriate. For example specific computer code may not be listed for achieving each of the steps discussed, however one of ordinary skill would be able, without undo experimentation, to write such code given the enabling disclosure herein. Such code is intended to fall within the scope of at least one exemplary embodiment.

Additionally exemplary embodiments are not limited to earpieces, for example some functionality can be implemented on other systems with speakers and/or microphones for example computer systems, PDAs, BlackBerry® smart phones, cell and mobile phones, and any other device that emits or measures acoustic energy. Additionally, exemplary embodiments can be used with digital and non-digital acoustic systems. Additionally various receivers and microphones can be used, for example MEMS transducers, diaphragm transducers, for example Knowles' FG and EG series transducers.

Notice that similar reference numerals and letters refer to similar items in the following figures, and thus once an item is defined in one figure, it may not be discussed or further defined in the following figures.

The AORS records audio information and can obtain information from at least one acoustic sound sensor(s) (microphones) mounted in the ear-sealing assembly. The ear-sealing assembly can provide a Noise Reduction Rating of 20-30 dB. In at least one exemplary embodiment of the present invention a number of microphones are located outside the occluded ear canal to monitor sound pressure levels near the entrance to the ear canal (this is the Ambient Sound Microphone—ASM) and within the occluded ear canal to facilitate monitoring of sound within the ear canal (this is the Ear Canal Microphone—ECM). The signal generated by the ASM allows for a binaural recording of the user's recent sound exposure for purposes such as automatic dictation and transmission to a binaural audio signal recording and/or monitoring system. In addition, the signal generated by the Ear Canal Receiver (ECR) may be recorded to analyze the performance of the signal processing assembly within the earphone. Thirdly, the signal generated by the ECM may be recorded to analyze and predict the sound stimulus the user's ear drum is exposed to.

The AORS user can audition a recent sound exposure history in the absence of a second signal processing device by recalling data stored in a circular buffer of computer data memory located within the earphone structural assembly. U.S. Pat. No. 5,887,070 describes an insert earphone for reproducing audio content (e.g. audio from a Personal Media Player or cell phone) to a user, but differs from at least one exemplary embodiment of the present invention by at least not including any sound sensors or a device to record the user's local sound field. The particular sound sensors in at least one exemplary embodiment of the present invention can be mounted at the entrance to the occluded ear canal, and these microphones are called the Ambient Sound Microphones (ASMs). By recording the output of the left and right ASMs, a binaural recording is therefore obtained.

U.S. Pat. No. RE38351 describes an insert earphone for the reproduction of audio content using a receiver mounted in a soft foam assembly that forms a seal in the same ear canal. The AORS disclosed in at least one exemplary embodiment of the present invention differs from U.S. Pat. No. RE38351 with at least the inclusion of a number of microphones mounted in each left and right earphone.

U.S. Pat. No. 5,946,050 discusses a system for monitoring a broadcast audio signal for particular verbal messages ("keywords") that activate an audio recording system to record the broadcasted signal. U.S. Pat. No. 5,946,050 uses a circular audio buffer for the input audio signal, so therefore the audio information slightly before the keyword occurs can also be recorded, which is useful for giving a context of the audio before the keyword occurs. In at least one exemplary embodiment of the present invention AORS differs from such automatic recording devices as U.S. Pat. No. 5,946,050 by specifically using binaural microphone output signals as the recorded data and also facilitates a recording to be activated by a manual user operation, such as by pressing a button on the earphone device, or automatically, in response to a particular non-speech acoustic stimulus (which shall be described later).

In addition to the ASMs, the output of one or more acoustic sensors within the occluded ear canal of the AORS user is recorded. This is measured using an Ear Canal Microphone (ECM), which is acoustically isolated from ambient sound (i.e. sound in the user's immediate environment, outside of the ear canal). Taken in combination with the ASM signal, this facilitates recording of both the ambient sound exposure of the user and the actual sound exposure that the user perceives (or at least, the sound which the user's ear drum is stimulated with). The signal reproduced by the Ear Canal Receiver can also be recorded. The electronic signal generated by the ASMs can be used to create a Binaural Recording, maintaining the unique Head Related Transfer Function of the user when the recording is replayed using earphones.

U.S. Pat. No. 7,039,195 describes an ear terminal device with the following features: an ear plug forming a seal in the user's meatus, in which is housed: an ambient sound microphone to monitor sound outside the user's meatus; an ear canal receiver to reproduce a mix of sound detected by the ASM and also audio content e.g. from a remote user via radio; an ear canal microphone to detect sound in the blocked ear canal of the user. U.S. Pat. No. 7,039,195 includes an electronics circuit for undertaking active noise cancellation using the ASM and ECR signal. At least one exemplary embodiment of the present invention differs from U.S. Pat. No. 7,039,195 in a number of ways. For example, the ASM in at least one exemplary embodiment is recessed in the meatus, and monitors sound which has been modified by transmission through a diaphragm that modifies the sound in a number of ways, for example one such way is that the diaphragm is tuned to resonate in such a way as to compensate for spectral sensitivity of the ASM. Another way is that the diaphragm undertakes beam-forming using holes located at particular locations in the diaphragm, this allows the spatial sensitivity of the signal detected by the ASM to be altered; e.g. increasing sensitivity in the direction of the user's head direction.

U.S. Pat. No. 6,567,524 describes a system that uses the assembly described in U.S. Pat. No. 7,039,195 and a signal processing circuitry to determine if the ear plug is correctly fitted by reproducing a predefined test signal with the ECR and measuring the response with the ECM and comparing this new measured response to a stored measured response. Again, the present invention does not describe a method or object related to this intended function of U.S. Pat. No. 6,661,901.

U.S. Pat. No. 4,088,849 discloses a binaural recording system, utilizing an ambient sound microphone on the external body of a circum-aural headphone. This does not provide a true binaural recording, as the microphone sensors are not mounted at the entrance to the ear canal.

U.S. Pat. No. 4,819,270 is a binaural recording system comprising a pair of small, visually unobtrusive microphones intended to be mounted near the user's ear, but outside of the pinna (e.g. mounted on the ear support of common eyewear). Again, this system does not provide a true binaural recording, as the microphone sensor is not coincident with the user's ear canal opening (i.e. ear meatus).

US Pat. No. 2006/0182287 describes an earphone monitoring system, with microphones mounted at the entrance to an occluded ear canal (i.e. ASMs), and ear-canal receivers mounted in the same earphone. The present invention differs from US Pat. No. 2006/0182287 with the addition of a sound recording system to permit binaural recordings of the ASM, and a recording activation system to automatically or manually start and stop the recording in response to either a user action or a specific event in the user's local environment.

The archival recording functionality provided by the AORS is activated in a number of ways. Besides a manual user-invoked recording, the recording may be initiated automatically in response to an accident in the physical locality of the user, detected by the AORS with the microphones within the earphone assembly.

Archival recording may also be initiated in response to particular sound. The Transient Event Detector subsystem of the AORS activates recording in response to a particular transient response in the user's local sound field, as detected by the Ambient Sound Microphones (and the response of the Ear Canal Microphones may be used by the Transient Event Detector subsystem).

A transient event detector to specifically detect breaking glass by an acoustic analysis of a sound field is described in U.S. Pat. No. 5,917,410, which uses a multiband pressure (or voltage) envelope profile analysis and considers relative inter-band phase.

When the Transient Event Detector subsystem in the present invention detects a transient with the ASMs, archival recording is activated and a time-stamp is saved separately or embedded within the audio data stream. The time stamp taken with or separately to the audio recording may be used for an audio forensic examination of the user's sound exposure history profile.

The AORS includes a low-memory detection system to detect whenever the computer data memory used for the archival recording is below a particular threshold, and to inform the user with an auditory message. This threshold may be relative (e.g. 10%) or absolute (e.g. 10 minutes or 10 MB).

US Pat. No. 2004/0268078 describes a system for detecting low remaining computer data memory. Unlike US Pat. No. 2004/0268078, the AORS does not require two separate data computer memory segments for the audio data storage. This is advantageous as the data storage system for archival of audio recorded with the AORS may be on a physically separate second device, such as a PMP, and the second device may not allow for partitioning of storage memory (e.g. due to security features of the second hardware and software system).

At least one exemplary embodiment is directed to an apparatus and method for a self-contained Always-On headwear Recording System (AORS) that can use as its inputs the electronic signal produced by a plurality of microphone sensors mounted in one or more earphone assemblies that can be in the left and/or right ear of an AORS User. This facilitates monaural or binaural recording using the output of microphone sensors that monitor sound at the entrance to the occluded or partly occluded ear canal (ear meatus) of the user. In addition, the AORS can use as its data inputs the electronic signal generated by signal processing assemblies in the AORS or from a second device such as a Personal Media Player (PMP) or cell-phone. The audio input data signals to the AORS are constantly recorded to a data storage system such as a circular buffer of non-volatile RAM mounted locally on the earphone assembly. This facilitates retrieval of a user's recent sound exposure (e.g. the last 10 minutes) for purposes such as determining a user's sound exposure preceding an accident (similar to a flight data recorder, or "black box" device) or facilitates the user to listen-again to a recent speech conversation. Recording of the monitored audio signal to a second audio data storage device can be initiated manually following a user-generated command, or automatically in response to a locally produced sound, such as a user-defined verbal activation message or a transient sound such as a gunshot or a motion detecting platform that indicates the AORS User is in the vicinity of an accident. The AORS can communicate with a remote audio signal analysis system that undertakes speech-to-text translation, and returns a text transcript of a conversation involving the AORS user.

The present invention describes the apparatus and method for a self-contained Always-On headwear Recording System (AORS). The AORS allows a user of a voice communication system to keep a record of their personal sound exposure, such as a recent conversation they had. The AORS is constantly recording a variety of audio signals to a circular audio buffer, therefore when the recording feature to a second audio storage device (e.g. a cell-phone) is activated, the user already has a recent record of their sound exposure. This is particularly useful in applications such as dictating, whereby we often decide that we wish to record a conversation AFTER particularly interesting information has been heard.

Another use of the AORS is for audio forensics to determine a sound exposure of a listening prior to an accident. The contents of the circular buffer can be analyzed later in case of device failure. Alternatively, the AORS can detect sounds indicative of an accident or emergency, such as gunshots or car-crash sound, which can automatically start recording to the AORS user's local sound field without the user having to manually activate recording—which may be difficult for the user under dangerous circumstances (e.g. if they suddenly come under fire).

The AORS can use as its inputs the electronic signal produced by a plurality of microphone sensors mounted in one or more earphone assemblies that may be in the left and/or right ear of an AORS user. This allows for monaural or binaural recording using the output of microphone sensors that monitor sound at the entrance to the occluded or partly occluded ear canal (ear meatus) of the user. These microphone sensors detect sound pressure in the occluded ear canal of a user (the Ear Canal Microphones—ECMs) or detect sound at the entrance to the user's occluded ear meatus (the Ambient Sound Microphones—ASMs). In addition to these transducers, an ear canal receiver (ECR) can create a sound pressure on the ear-drum side of the earphone device, which may be used to reproduce sound from the ASM and/or ECM, in addition to audio content, for instance from a Personal Media Payer or mobile phone.

In addition to, or alternatively to, the ASM and/or ECM signals, the AORS may use as its data inputs the electronic signal generated by signal processing assemblies in the AORS or a second device such as a Personal Media Player (PMP). The input data signals may be recorded and/or monitored by a system on a second device (such as a PMP) for archival, forensics or other purposes. The audio input data signals to the AORS are constantly recorded to a data storage system such as a circular buffer of non-volatile RAM mounted locally on the earphone assembly; the AORS therefore operates as a self-contained system. This allows for retrieval of a user's recent sound exposure (e.g. the last 10 minutes) for purposes such as determining a user's sound exposure preceding an accident (similar to a flight data recorder, or "black box" device).

Recording of the monitored audio signal may be initiated manually following a user-generated command or automatically in response to a locally produced sound, such as a user-defined verbal activation message or a transient sound-detecting platform or a motion detecting platform that indicates the AORS user is in the vicinity of an accident. The AORS may communicate with a remote audio signal analysis system that undertakes speech-to-text translation, and returns a text transcript of a conversation involving the AORS user.

A Recording Status Alert System (RSAS) is included as an optional part of the AORS to inform the user and other individuals of the operating status of the AORS—e.g. if it is recording ASM signals to a second data storage device (i.e. other than the circular buffer).

Figure 1B:
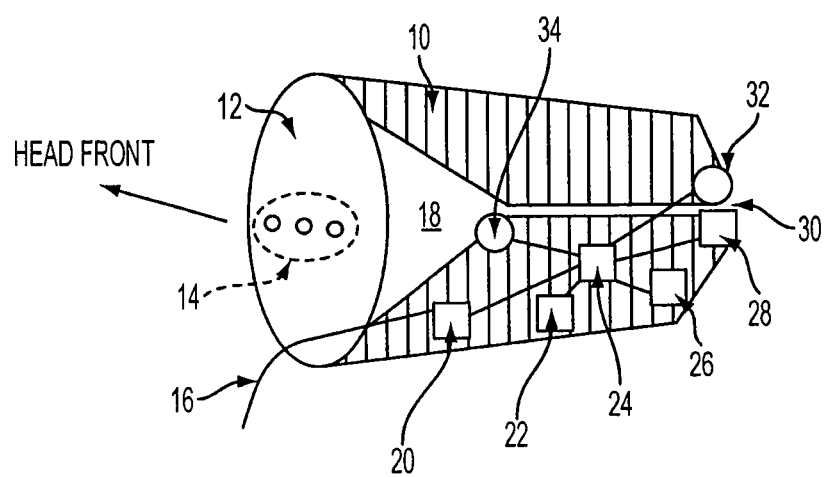
FIG. 1B is an illustration of a general configuration of a device (e.g., earpiece) in accordance with at least one exemplary embodiment.

An example of an embodiment of an electroacoustic assembly that the Always On (Headwear) Recording System (AORS) may function with is given in FIG. 1A and FIG. 1B. This shows the earphone body 10, which houses the electro acoustic transducers (microphone 34, loudspeaker 28, and microphone 32) and electronic units (communication circuitry 20 (also referred to herein as communication system 20, audio control data communication system 20 or system 20), memory 22, processing unit 24, and memory 26). The earpiece 8 forms a seal in the ear canal 1 of a user, with the outside end (at diaphragm 12) substantially flush with the entrance 7 to the ear canal 1 (i.e. the ear meatus)—i.e. the hearing protection device shown in this embodiment is a "completely in the ear" type, which provides passive sound attenuation of ambient sound transmitted to the eardrum 2 of the user in the order of 20-25 dB over the frequency range of human hearing (50-20 kHz). An ambient sound microphone (ASM) 34 detects sound in the front chamber 18, which may be filed with air or another substance such as a gel. An additional ASM 6 may also be present on the outside of the earphone body to undertake active beam-forming and to provide for more omni-directional monitoring of the ambient sound field. An ear canal microphone (ECM) 32 may detect sound from the eardrum 2 side of the earpiece 8. The ASM 34 may also detect sound from the eardrum 2 side of the earpiece 8 via transmission tube 30. The front diaphragm 12 serves a number of functions; it may be acoustically tuned so as to absorb certain frequencies more than others—and to therefore let affect the frequency response of ambient sound transmitted into chamber 18 and detected by ASM 34. This, along with the acoustic resonance of chamber 18, can compensate for non-linear sensitivity of the ASM 34. Furthermore, the diaphragm 12 and air-space can also increase the overall electroacoustic sensitivity of a signal output by the ASM 34 (referred to herein as an ASM signal) by working as an acoustic impedance transformer.

Holes 14 may be present in the diaphragm 12 to affect the directional sensitivity of the ASM 34; i.e. passive beam-forming, which is a phenomenon familiar to those in the art. A number of holes may be present to increase the directional sensitivity of the ASM signal, for instance in the direction of the user's mouth. In some embodiments, there are multiple ASMs in the front chamber 18, separated by dividing walls in the chamber 18. These multiple microphones may then be used for active beam-forming purposes in combination with external ASM(s) 6 using delay and summing/differencing networks. Communication circuitry 20 communicates with the other earphone device and other external devices such as Personal Media Players, computing devices, mobile phones, using either wired means (for example, communications cable 16) or wireless means (e.g. Bluetooth communications assembly 4 or may be on an external assembly such as a belt-pack or behind-the-ear assembly and may be coupled via port 5). The earphone may also communicate with a computer via miniature USB port 3. The loudspeaker 28 (also referred to herein as ear canal receiver 28) is used to reproduce sound in the eardrum side of the earpiece 8 (also referred to herein as earphone device 8). Signal amplification and analog filtering circuitry for the loudspeaker 28 and microphones 32, 34 may be housed next to the respective transducer, or may be part of the processing unit 24 (also referred to herein as DSP unit 24), along with digital-to-analog converters. Non-volatile RAM memory 22 (also referred to herein as RAM 22) may be used to store signals created by the DSP unit 24 or the microphones 34, 32. Program code and pre-recorded audio may be stored in the ROM memory 26 (also referred to herein as ROM 26). These individual hardware components (i.e. memory 22, 26, processing unit 24 and communication circuitry 20) may be separate or combined into a single unit 10. A battery 9 is housed in one or both of the earphone devices 8 (power may be transmitted from one earphone device 8 to the other via communications cable 16, and may be recharged using USB communications port 3). The tube 30 may act as a pressure equalization tube, to allow for equalization of static pressure between the eardrum side of earpiece 8 and the outside world. There may be more than one pressure equalization tubes, and they are designed to have a bore sufficiently small so as to reduce the transmission of ambient sound to the eardrum 2 of the user.

Figure 1C:
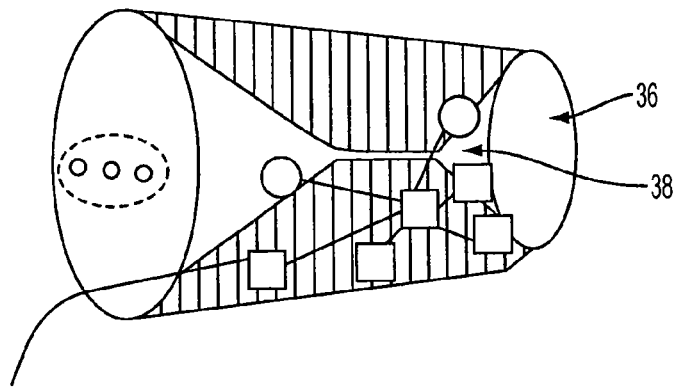
FIG. 1C is an illustration of a general configuration of a device (e.g., earpiece) in accordance with at least one exemplary embodiment.

FIG. 1C shows another example of an embodiment of the earphone device 8, which differs from the example in FIG. 1B with the addition of a rear chamber 38 on the eardrum side of the earphone device. This chamber serves a similar function to the previously described front chamber 18; to act as an acoustic impedance transformer to increase sensitivity of the ear canal microphone 32 and to improve the coupling of the ear canal receiver 28 to the air space between the earphone device 8 and the eardrum 2. The space formed by rear chamber 38 may be filled with air or another substance such as gel, and is protected by the diaphragm 36 which may be acoustically tuned to resonate to compensate for spectral non-linearity in the response of the transducers (loudspeaker 28, ear canal microphone 32).

Figure 2A:
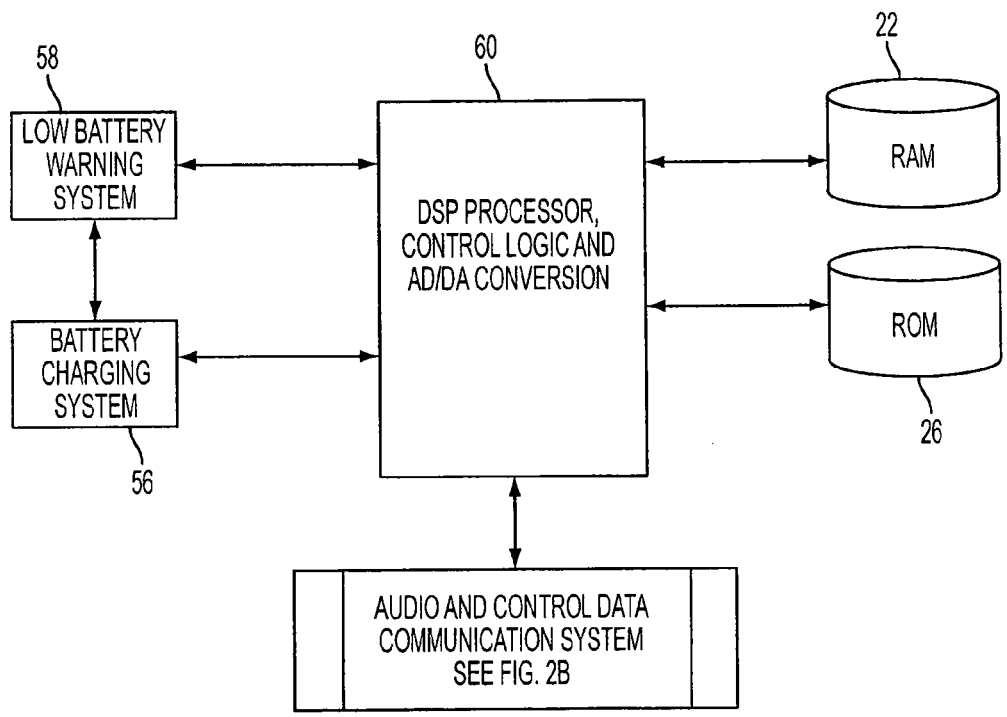
FIG. 2A is a general configuration of a device according to at least one exemplary embodiment.

FIG. 2A shows an electrical wiring overview of the Acoustic Management System. The low-battery warning system 58 informs the user of the remaining battery power, e.g. giving warnings when there is 10% and 5% remaining battery. In some embodiments of the system, the low battery warning system 58 creates a perceptually intrusive and annoying sound with the ear canal receiver 28, e.g. a voice message and a noise burst, when the battery power is critically low—to inform the user that they must remove the earphone device 8 and recharge the earphone device 8 (using battery charging system 56). The computer memory RAM 22 is used for storage of audio data and control data, and also for reproduction of previously stored recordings, or music audio which may be uploaded via the communications unit shown in FIG. 2B. The computer memory ROM 26 is a ROM unit for storing program code and pre-recorded audio for alerts etc.

Figure 2B:
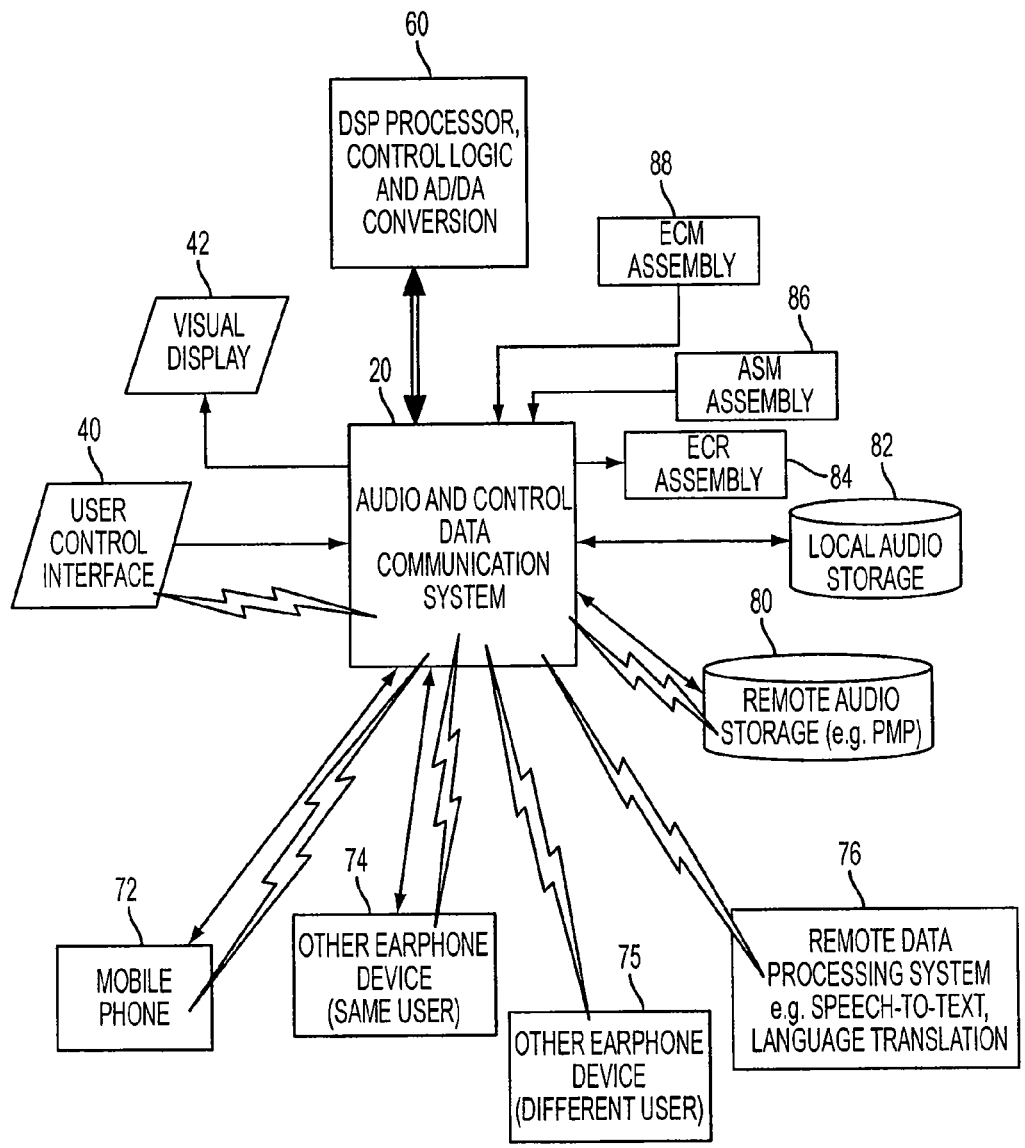
FIG. 2B is a general configuration of a device according to at least one exemplary embodiment.

The Audio and Control Data Communication system 20 shown in FIG. 2B is for communication of the digital microprocessor 60 (also referred to herein as DSP processor 60) with other remote devices and circuitry in the earphone device 8. The system 20 acts as an A/D converter for an ECM signal from ECM assembly 88 and ASM signal(s) from ASM assembly 86, as well as a D/A converter for the ECR assembly 84. The assemblies (88, 86, 84) for these transducers signals include analog gain and frequency equalization filters (which may include analog or digital circuitry, or both). The system 20 communicates with other systems in the earphone device 8 such as local audio storage 82 (e.g. a RAM computer memory) as well as external devices such as a remote audio storage 80 (e.g., a PMP) (for both retrieval of audio content and for use as a storage system for recorded audio), and also other signals such as audio signals from mobile phones 72, other earphone devices 74 worn by the same user or other earphone devices 75 worn by different users. System 20 may also communicate with a remote data processing system 76 (e.g., for speech-to-text, language translation). The means of communication of the audio or control data signals may be by wired or wireless means. The optional visual display 42 gives the user information about the operating status of the earphone device 8, e.g. remaining memory, battery, recording status, as well as informing other people of the operating status of the earphone device 8—e.g. if the earphone device user can hear their ambient sound field, or if they are busy with a phone call. The visual display may be combined with the user control interface 40, or may be separate. The control interface may use, for example, a touch-sensitive screen system or separate buttons, and may be mounted on a user-wearing jewelry such as a bracelet, that can also be used for marketing purposes such as to advertise a brand name or non-commercial campaign.

Figure 3A:
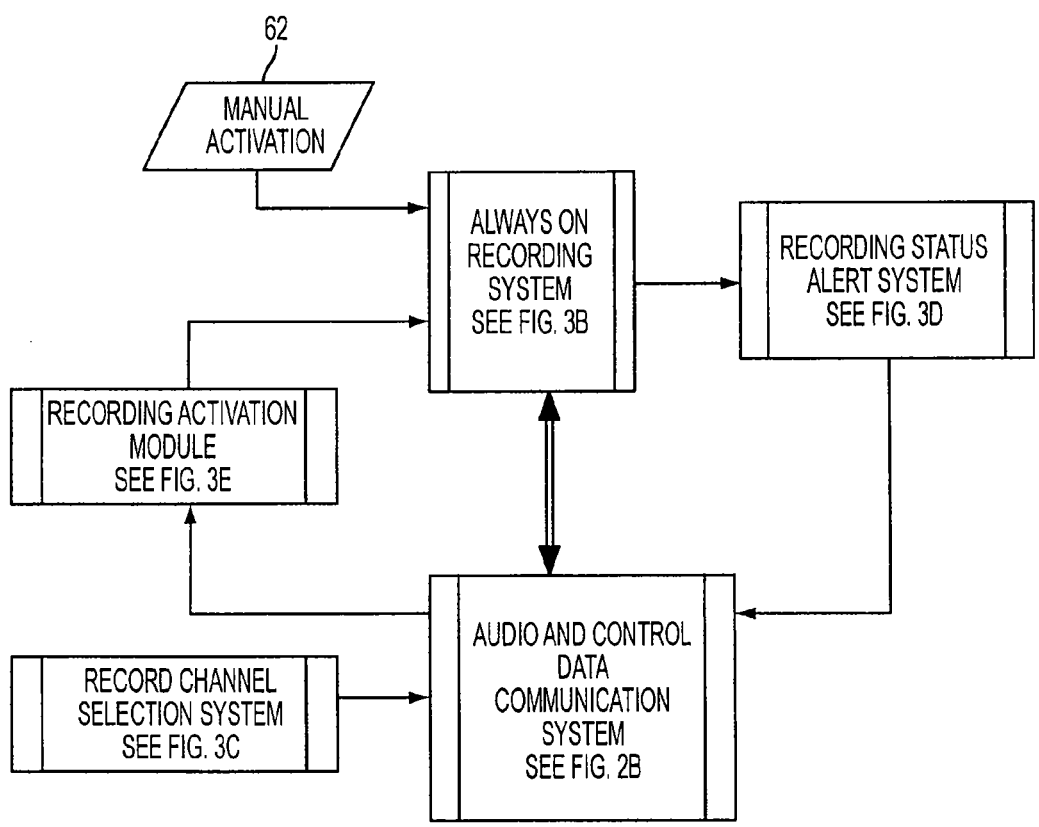
FIG. 3A is a general configuration of a device including an Always on Recording System according to at least one exemplary embodiment.
Figure 3B:
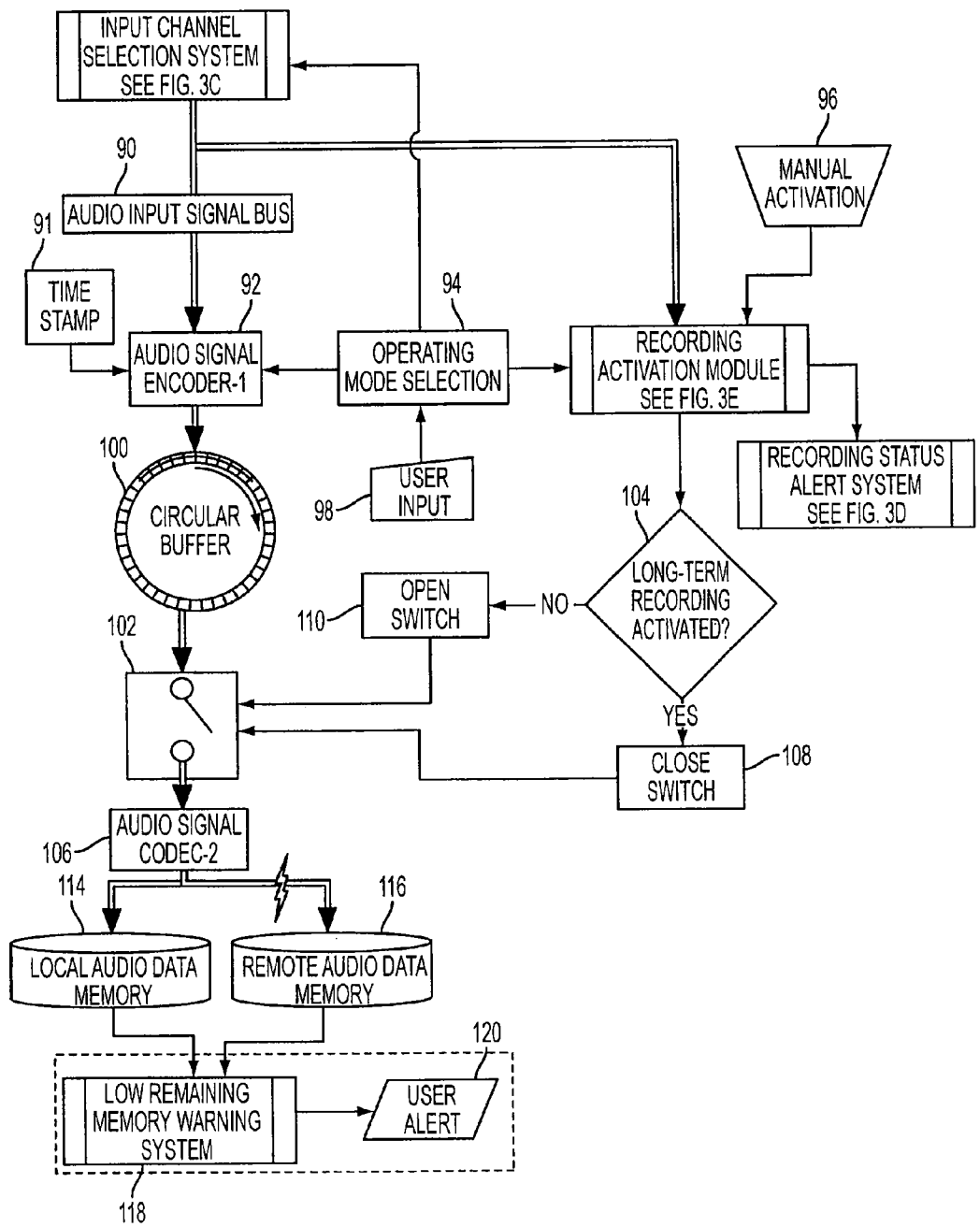
FIG. 3B illustrates a flow chart of processes in accordance with at least one exemplary embodiment.

FIG. 3A depicts a functional overview of the Always On Recording system (AORS)—which is described in FIG. 3B—in relation to various audio and control data communication channels through the communications assembly shown in FIG. 2B. The AORS is always recording one or more audio signals to a circular data buffer (such as the non-volatile RAM 22), so when the permanent recording is activated either automatically (see FIG. 3E) or manually 96 (see FIG. 3B) with manual activation unit 62, the contents of this buffer (which may be a history of the last 10 minutes—or any time duration determined by the user or determined automatically) is also recorded. The audio channels that are recorded are selected by the system described in FIG. 3C. The recording status alert system shown in FIG. 3D informs the user and other individuals the user may be communicating with (e.g. with a cell phone) that the audio is being permanently recorded, e.g. with an auditory message or repeating sound cue such as a periodic beep.

FIG. 3B gives a functional overview of the Always On Recording System. The operating mode selected 94 by the user with user input system 98 (which may be configured using a computer) selects which channels will be continuously recorded to the circular buffer 100. When the "recording activation module" described in FIG. 3E selects the "long-term" mode, then the audio data on audio input signal bus 90 and the contents of the circular buffer 100 are recorded to a data storage device with a larger memory capacity than the circular buffer 100. This is affected by switch 102, as decided by decision logic 104, switch-opening circuitry 110 and switch-closing circuitry 108 (which enables the audio to be recorded to the larger memory device). The selected audio signals may first be processed by a first audio encoder-1 92. This may reduce the data-rate using lossy or loss-less audio signal encoding algorithms, e.g. using a perceptual encoder or Hoffman encoding. The signal recorded in circular buffer 100 may therefore be an encoded signal representing many multiplexed audio channels. The buffer may also record non-audio data, such as a time-stamp generated by time stamp unit 91 that may be updated on a sample-by-sample or intermittent basis. The circular buffer 100 may be made using non-volatile computer memory, so that in the event of an accident, an audio record of the audio signals exposed to the user, or (for example) the audio signals detected by the ASMs, can be analyzed similar to a "black box" in-flight recorder used in airplanes. When the switch 102 is closed, the audio signal may be further encoded or decoded using Audio Signal CODEC-2 106, before being recorded to either or both a local audio data memory 114 or a remote audio data memory 116.

A low remaining-memory warning system 118 monitors the remaining memory of the audio data memory 114 and/or 116 and issues auditory, visual, or tactile warnings (or a combination of the above) with user alert system 120 to the user when the remaining-memory level becomes low (e.g. a 10, 5 and 1 minutes warning). The recording status alert system shown in FIG. 3D informs the user and other individuals the user may be communicating with (e.g. with a cell phone) that the audio is being permanently recorded, e.g. with an auditory message or repeating sound cue such as a periodic audio beep.

Figure 3C:
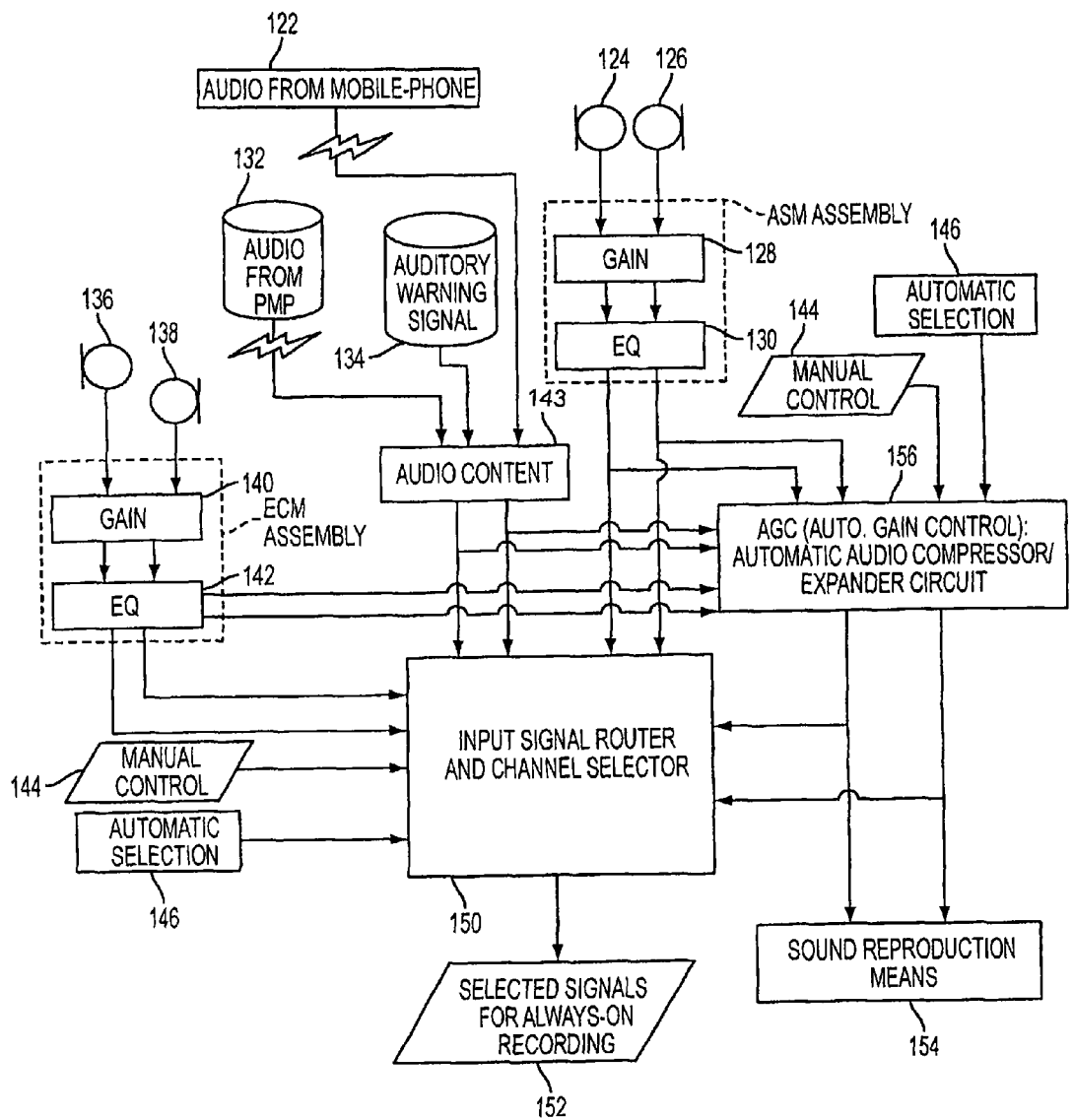
FIG. 3C illustrates a flow chart of processes in accordance with at least one exemplary embodiment.

FIG. 3C shows a Functional overview of an Always On Recording System channel-record selector system. The system selects which audio signals are continuously recorded using the AORS 152, and also which signals are monitored by the user with sound reproduction means 154 (e.g. the Ear Canal Receiver—ECR). Examples of such audio signals are: the left 136 and right 138 Ear Canal Microphones (ECMs), via ECM signal conditioning circuitry including gain 140 and filtering (illustrated as equalizer (EQ) filter 142) (which may use either or both analog and digital filtering means); the left 124 and right 126 Ambient Sound Microphones (with signal conditioning circuitry (i.e., gain 128 and EQ filter 130); and audio content 143 (audio signals from a mobile phone 122; auditory warning signals 134 created by either or both the earphone device (e.g. a low-battery signal) or another device; and audio from a PMP 132 (which may be a mono or stereo signal)). The signals that are monitored with sound reproduction means 154 are selected and mixed using the AGC unit 156, which may be configured either manually 144 or automatically 146. The signal selector 150 determines which signals are recorded with the AORS 152 using either manual 144 or automatic 146 configuration means.

Figure 3D:
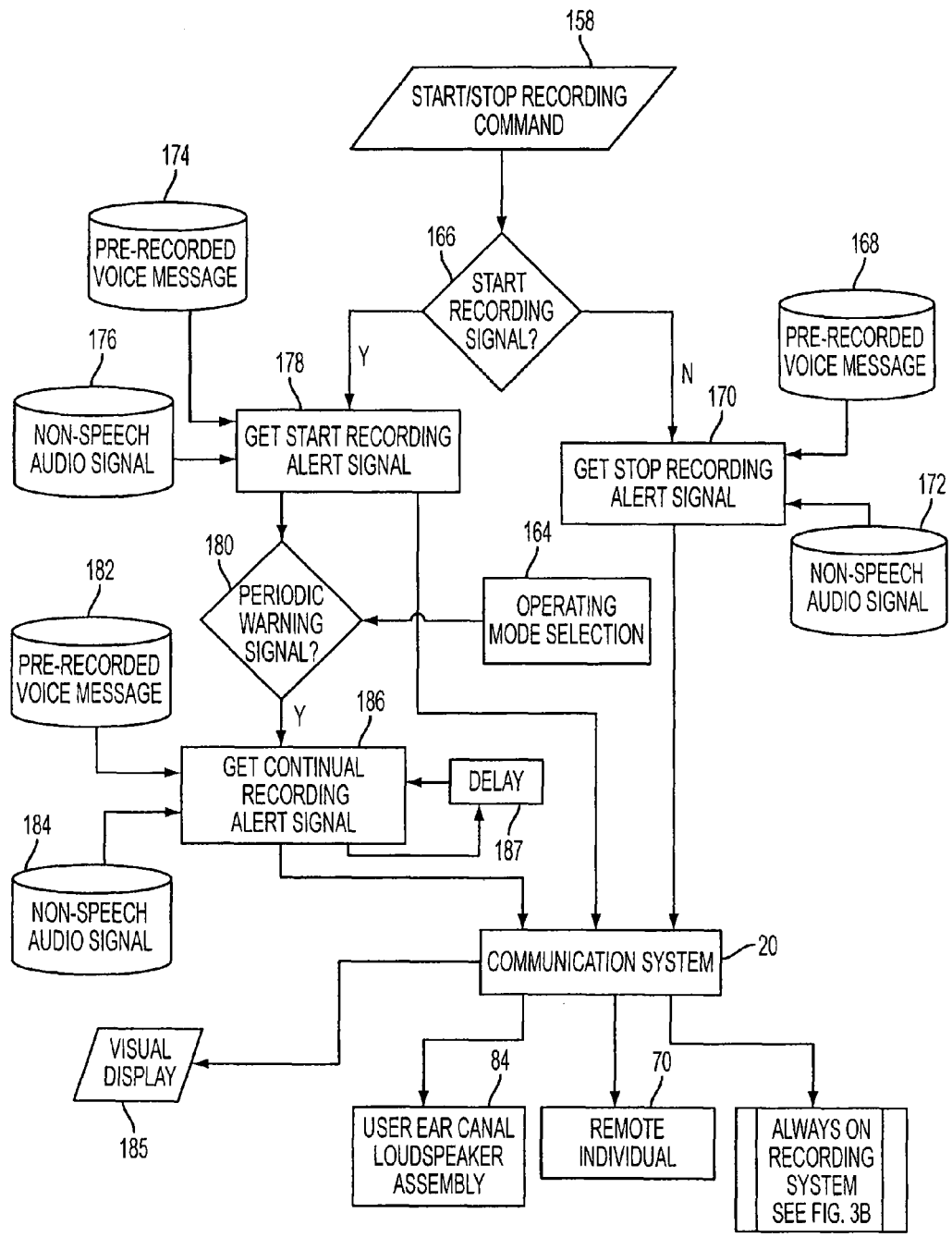
FIG. 3D illustrates a flow chart of processes in accordance with at least one exemplary embodiment.

FIG. 3D gives a Functional overview of the Recording Status Alert System. This system informs the headphone device user and any other individuals whom the user may be communicating with (e.g. with a mobile phone) that the AORS is recording particular audio signals to a permanent audio data storage device. When the AORS is activated (see FIG. 3E) to continuously record the contents of the circular buffer to a second data storage device (e.g. a PMP—as shown in FIG. 3B) with a start recording signal, or to stop this recording, the system in FIG. 3E takes the stop/start recording command 158 and if this is a "stop" signal (determined by unit 166) then a stop signal is generated using apparatus 170 (e.g. a voice message 168 or a non-speech audio signal 172). If a "start" message is generated, then a different audio signal may be generated using system 178 (e.g. a voice message 174 or a non-speech audio signal 176). If a particular operating mode is selected 164 (such as for a periodic warning signal 180), then a repeating auditory message may be reproduced 186 (with delay 187), which again may be a voice message 182 or a non-speech audio signal 184. The particular auditory message is communicated via communications system 20 to the ear canal receiver (loudspeaker) assembly 84 of the user, or to another individual who the user may be talking with via mobile phone (for example remote individual 70), and this message may also be recorded by the AORS. Besides an audio message, the Recording Status Alert System may also generate a non-sound message, such as a visual indicator light mounted on the earphone device (for example on visual display 185), to inform other individuals that the AORS is recording 185.

Figure 3E:
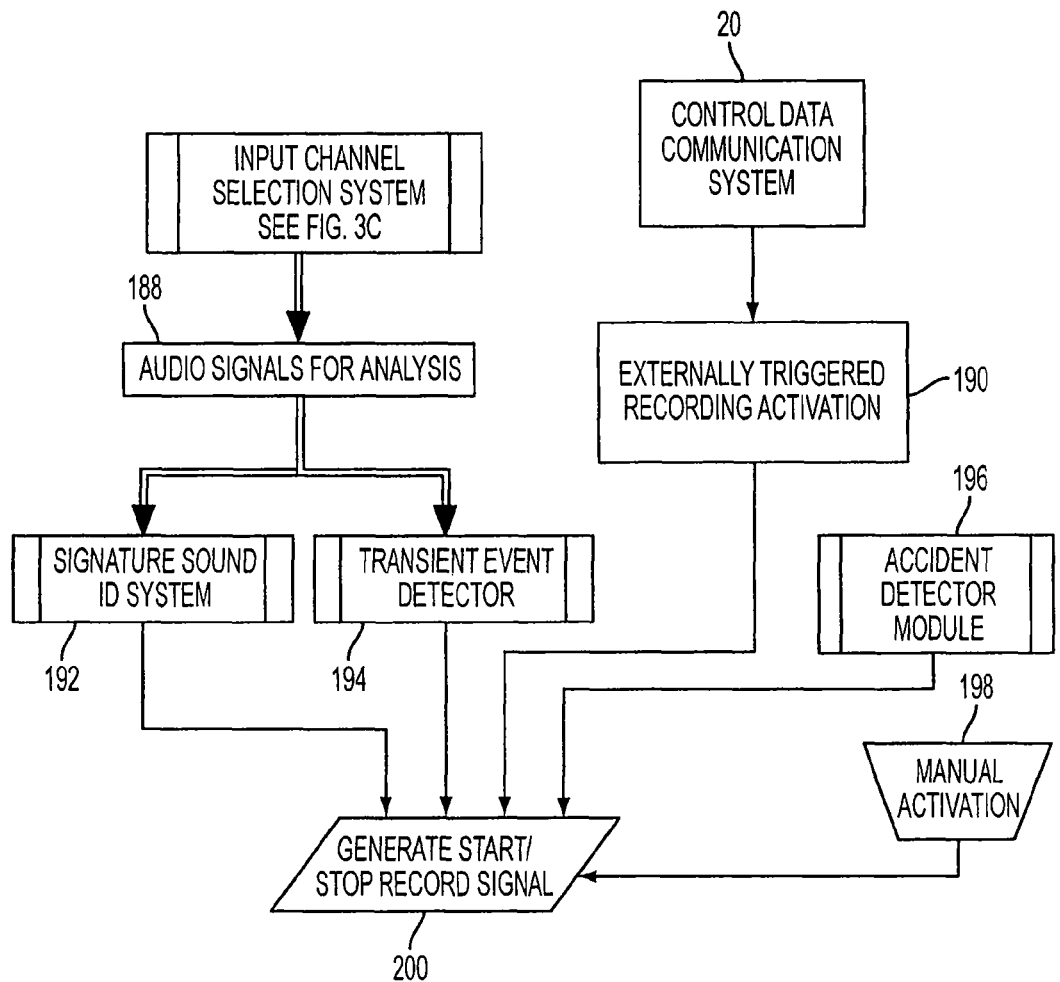
FIG. 3E illustrates a flow chart of processes in accordance with at least one exemplary embodiment.

FIG. 3E depicts a functional overview of the Recording Activation system for the AORS. This system starts recording 200 of the circular buffer to a second data storage device (see FIG. 3B). The system may be triggered manually 198 by the user, or manually by a remote individual (i.e., externally triggered 190) via the control data communication system 20. Alternatively, the AORS recording may be triggered automatically by monitoring the audio signals 188 selected for recording (see FIG. 3C) or other signals, such as the ambient or ear canal microphones. One example of an automatic activations system is the signature sound ID system 192 (SSIDS). This detects certain speech or non-speech sounds, which may be predefined or defined by the user. Such sounds could be a certain number of hand-claps, a gun-shot, an explosion, a particular whistle, or a key-word or words such as "record". Another activation method is by detecting transient sounds 194 which may be indicative of an accident. Accident detection may be determined by accident detector module 196.

At least one exemplary embodiment is directed to a self-contained Always-On Recording System (AORS) which operates like aviation "flight recorders" by storing a recent history of electronic sound signals presented to a user with an earphone device whilst simultaneously recording sound in the user's local ambient sound field using an Ambient Sound Microphone at the entrance to the user's fully or partially occluded ear canal, and simultaneously recording sound in the user's occluded or partially occluded ear canal using an Ear Canal Microphone.

The AORS comprises: an assembly to monitor the acoustic field in a user's immediate environment using an Ambient Sound Microphone (ASM) to monitor sound at the entrance to one or both occluded ear canals; a signal processing circuit to amplify the signal from the ASM and to equalize for the frequency sensitivity of the microphone; an assembly to monitor the acoustic field in an occluded ear canal comprising a microphone mounted in an earpiece that forms an acoustic seal of one or both ear canals of a user (this is the Ear Canal Microphone; ECM); a signal processing circuit to amplify the signal from the ECM and to equalize for the frequency sensitivity of the ECM; an optional signal processing circuit to amplify and process an audio content input signal (e.g. from a Personal Media Player, cell phone, or automatically-generated auditory warning signal); an audio signal router and switching matrix to select which of three sets of audio signals discussed above is to be recorded using the AORS; a user AORS configuration system (e.g. a physical switch on the earphone or a software-based selection system on a computer) that controls the audio signal router and switching matrix; an optional audio signal multiplexing and lossy or lossless data-rate reduction system for processing the audio signals from the audio signal router and switching matrix; a data storage device (e.g. non-volatile RAM) to act as a circular buffer for constantly recording the output signal of the optional data-rate reduction system, or the audio signals from the audio signal router and matrix, into a circular computer memory data buffer, comprising non-volatile RAM mounted either within the earphone assembly or on a second data-storage device (e.g. a PMP); an AORS record-activation system to activate recording of the contents of the circular buffer to a second audio signal data storage device, such as a hard-drive on a PMP; an optional second audio signal multiplexing and lossy or lossless data-rate reduction system for processing the audio signals from the circular buffer in before transmission to a second audio signal data storage device, such as a hard-drive on a PMP; an optional time-stamp audio index system for embedding a time-coded index into the audio signal data transmitted to the second audio signal data storage device; a system for transmitting either the audio signal stored in the circular buffer or the reduced data-rate signal to a second data storage device, such as with a wireless transmitter or physical wire; an earpiece that forms a seal in the ear canal of the AORS user which houses the above ASM, ECM, ECR and electronic components; an optional pressure equalization tube to equalize the pressure on the ear-drum side of the earpiece relative to the ambient pressure.

At least one future exemplary embodiment can further include a diaphragm to cover the ASM to provide one, all, or a combination of the following capabilities: an acoustic diaphragm covering the ASM with holes at specific locations to provide passive beam-forming. The holes may be covered by a different material than the diaphragm material; such as a grill, a different material, an air space (i.e. no covering); an acoustic diaphragm covering the ASM that is tuned to resonate at pre-determined frequencies. The tuning of the diaphragm is such that different frequencies are transmitted through the diaphragm (and into the space behind, and thus detected by the ASM) with different attenuation losses; i.e. the Frequency-Dependant Noise Reduction Rating of the diaphragm is different for different frequencies; an acoustic diaphragm covering the ASM that is illuminated either behind the diaphragm (i.e. on the ear-drum side) or outside using LEDs to display the current operating status of the AORS; for instance, to show it is powered and active, to inform local individuals that the AORS user is currently recording their local ambient sound field, to inform local individuals that the AORS user is currently monitoring audio content and does not wish to be disturbed; and an acoustic diaphragm covering the ASM that can be used for marketing purposes to display a particular product brand, logo, or non-commercial public awareness campaign such as a "safe hearing" campaign.

Another exemplary embodiment of the invention can include a recording activation system to automatically start recording of the circular buffer to a second data storage device. The recording activation system comprises one, all, or a combination of the following; a Signature Sound ID system which continually monitors audio signals for particular speech keywords, particular sounds such as hand-claps, gun-shots or whistles, or general sounds such as a particular person's voice or a sound source which is approaching. The monitored audio may include one or a combination of the following: an ambient sound microphone signal form one or both earphone devices of the user; an ear canal microphone signal form one or both earphone devices of the user; an audio content from a remote individual (e.g. from a cell-phone or walkie-talkie); an audio content from a PMP such as a portable DVD player or computing device; a transient event detector that monitors audio signals from a transient sound event indicative of an accident. Monitored audio signals are listed a-d above; an accident detector system that analyzes motion of the user using miniature accelerometers housed within the earpiece assembly or housed elsewhere on the body of the user, and initiates recording of the circular buffer to a second data storage device when the accelerometers indicate a fall or that the user has been involved in a collision; an externally triggered activation system whereby recording of the circular buffer to a second data storage device can be initiated by a remote second individual with a wired or wireless communication means; a means to trigger recording of the circular buffer to a second data storage device whenever improper functioning of the earphone device is detected. Examples of improper functioning include: poor-fitting of the earpiece, electronics failure.

At least one further exemplary embodiment additionally includes a Recording Status Alert System (RSAS). The RSAS informs the user and other individuals whether the AORS has currently initiated recording of the circular buffer to a second data storage device. The RSAS system comprises the following: a decision unit to determine if the AORS is operating in a mode whereby the circular buffer is being recorded to a second data storage device. If so; the AORS is in "recording mode"; otherwise the AORS is in "non-recording mode"; a system to generate an audio signal when the AORS is switched from a "non-recording mode" to a "recording mode". This signal may be a pre-recorded speech message, a pre-recorded non-speech message, or may use an algorithm to generate a message; a system to generate an audio signal when the AORS is switched from a "recording mode" to a "non-recording mode". This signal may be a pre-recorded speech message, a pre-recorded non-speech message, or may use an algorithm to generate a message; an optional system to generate an audio signal when the AORS is in "recording mode" at repeating intervals; a communication system to transmit the audio signals above to one, all, or a combination of the following systems: the ear-canal receiver assembly of the AORS user in one or both earphone devices; a remote individual who the AORS user may be communicating with, such as via a mobile-phone or a walkie-talkie radio; the second data storage device of the AORS; an optional visual display system to inform the user of the status of the AORS. This may be a remote control unit, for instance worn on the wrist of the user. It may contain information about remaining battery life and remaining memory of the second data storage device, and the particular operating mode; an optional visual display system to inform other individuals in the vicinity of the user of the particular operating mode of the AORS; for instance, with LEDs mounted on the exterior of the earphone device which indicate if the "recording mode" or "non-recording mode" is currently operational.

At least one further exemplary embodiment includes a remote audio forensics analysis system for analyzing either the contents of the circular buffer or the data stored on the second data storage device. This remote audio forensics system includes all, either or a combination of the following functionality; an audio signal data communication system for transmitting the contents of the circular buffer to a remote server for analysis of the audio signal; an audio signal data communication system for transmitting the contents of the second data storage device (e.g. PMP or mobile phone) to a remote server for analysis of the audio signal; a data communication system for transmitting the analysis of the audio data back to the AORS user, e.g. via email, SMS text, or as a computer-generated speech text; a speech-to-text analysis system on the remote server; a language translation system to translate text from one language to another; a text-to-speech translation system to translate text into speech for transmission back to the AORS user; a text-based acoustic event logging system whereby the time-stamped audio data communicated to the server) is analyzed for pre-determined events such as transient sounds, and a log of the sound exposure of the user is made and optionally communicated back to the user, e.g. with an SMS or email; a system which analyzes the audio data to determine if the AORS user has been involved in an accident, e.g. if a car-crash or gun-fire sound is detected. The forensics analysis system then automatically informs another individual such as an emergency response team that the particular AORS user has been involved in a potential accident, and optionally sends this second party an audio record of the data that was analyzed.

In another exemplary embodiment, a Low-Memory Warning System detects if computer memory used to store audio signals is about to be exhausted and informs the user to take action. This system includes: a system to calculate the relative remaining memory in a second data storage device such as a hard-drive on a PMP or cell-phone, RAM computer memory in the earphone device or on a PMP. The first input to this remaining memory calculation system is the total memory of the second data storage device and the second input is the current total used memory of the second data storage device. The remaining memory calculation system returns a value either as a percentage or as a time value corresponding to the estimated total remaining record time (e.g. expressed in minutes); alternative to the relative remaining memory system is a system that calculates the remaining memory only in absolute terms (e.g. in MB) and returns a value related to this (e.g. by analyzing a data recording rate, an estimate of the remaining record time can be calculated); a series of electronic magnitude comparators (at least one) that compares the result of the remaining memory calculation system to a series of constants and returns a series of priority messages (the number of different possible messages is equal to the number of comparators). The numerical constants used by the comparators are related to remaining memory boundaries such as "10% remaining", "5% remaining" and "less than 1% remaining", and this comparator system works like a low battery-level warning system; an auditory user warning messaging system to inform the user when a remaining audio memory level is below a predefined value, this may be an auditory message automatically generated or reproduced from an audio signal generation circuit within the earphone assembly, or transmitted from a second device (e.g. PMP), the message may be in a number of forms, for instance, a verbal message that informs the user about the need to cease using the AORS, or a repeating very intrusive and annoying auditory message which forces the user to cease wearing the earphones; an optional visual warning messaging system to inform the user when remaining audio memory level is below a predefined value; and an optional tactile warning messaging system (such as a vibration system attached to the user's wrist) to inform the user when remaining audio memory level is below a predefined value.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. An analysis system comprising:
    at least one monitoring assembly mounted in an earpiece, the at least one monitoring assembly including at least one microphone to monitor an acoustic field proximate the earpiece, the at least one microphone producing at least one microphone signal responsive to the acoustic field;
    a data storage device configured to act as a circular buffer for continually buffering the at least one microphone signal; and
    an audio analysis system configured to analyze a content of the circular buffer,
    wherein the audio analysis system is configured to analyze the content of the circular buffer to detect at least one of a speech sound, a non-speech sound or a transient sound.

2. The analysis system according to claim 1, wherein the speech sound includes a verbal activation message.

3. The analysis system according to claim 1, wherein the audio analysis system is configured to analyze the content of the circular buffer over a predetermined time period responsive to at least one of a predetermined detected sound or a user indication.

4. The analysis system according to claim 1, wherein the audio analysis system is configured to analyze the content of the circular buffer to detect at least one sound indicative of an accident or an emergency event.

5. The analysis system according to claim 4, wherein when the accident is detected, the analysis system automatically transmits an indication to a remote location that a user of the earpiece has been involved in the accident.

6. The analysis system according to claim 1, wherein the earpiece includes first and second earpieces, each of the first and second earpieces being coupled to the data storage device.

7. The analysis system according to claim 1, wherein the data storage device is configured to receive at least one audio signal from a remote device.

8. The analysis system according to claim 7, wherein the remote device includes at least one of a mobile phone, a media player, a computing device or a further earpiece.

9. The analysis system according to claim 8, wherein the earpiece and the further earpiece are configured to be worn by a same user.

10. The analysis system according to claim 8, wherein the earpiece and the further earpiece are configured to be worn by different users.

11. The analysis system according to claim 1, wherein the at least one microphone includes a plurality of microphones.

12. The analysis system according to claim 1, wherein the earpiece is configured to occlude and form an acoustic seal of an ear canal.

13. The analysis system according to claim 12, wherein the at least one monitoring assembly includes at least one of:
   a first monitoring assembly including at least one Ambient Sound Microphone (ASM) to monitor an ambient acoustic field at an entrance to the ear canal occluded by the earpiece, the at least one ASM producing at least one ASM signal responsive to the ambient acoustic field, or
   a second monitoring assembly including at least one ear canal microphone (ECM) to monitor an internal acoustic field within the ear canal occluded by the earpiece, the at least one ECM producing at least one ECM signal responsive to the internal acoustic field within the ear canal,
   the data storage device continually storing at least one of the at least one ECM signal or the at least one ASM signal.

14. The analysis system according to claim 1, wherein the audio analysis system is remotely coupled to the earpiece.

15. The analysis system according to claim 1, further comprising:
   a further data storage device coupled to the data storage device,
   wherein the audio analysis system is configured to activate the further data storage device to record the content of the data storage device.

16. The analysis system according to claim 15, wherein the audio analysis system is configured to analyze data stored on the further data storage device.

17. The analysis system according to claim 16, wherein the audio analysis system includes a communication system configured to transmit at least one of the content of the circular buffer or the data stored on the further data storage device to a remote server for analysis of at least one of the content or the data.

18. The analysis system according to claim 17, wherein the audio analysis system is configured to receive results of the analysis from the remote server.

19. The analysis system according to claim 18, further comprising a text-to-speech translation system to translate the received results of the analysis from the remote server into speech.

20. The analysis system according to claim 15, wherein the audio analysis system is configured to activate the further data storage device responsive to detection of at least one predetermined sound.

* * * * *